(12) United States Patent
Schagunn

(10) Patent No.: US 6,308,931 B1
(45) Date of Patent: Oct. 30, 2001

(54) FLOW CONTROL VALVE FOR COOLING TOWER

(76) Inventor: James O. Schagunn, 1911 S. 78$^{th}$ Street E., Muskogee, OK (US) 74403

(*) Notice: Subject to any disclaimer, the term of this patent is extended or adjusted under 35 U.S.C. 154(b) by 0 days.

(21) Appl. No.: 09/580,065

(22) Filed: May 30, 2000

(51) Int. Cl.$^7$ ..................................................... F16K 5/02
(52) U.S. Cl. ............................................. 251/165; 251/188
(58) Field of Search ..................................... 251/161, 164, 251/165, 188, 310

(56) References Cited

U.S. PATENT DOCUMENTS

| | | | | |
|---|---|---|---|---|
| 944,025 | * | 12/1909 | Fowden | 251/310 |
| 1,976,052 | * | 10/1934 | Whittle | 251/161 |
| 2,504,297 | * | 4/1950 | Bordo | 251/161 |
| 3,233,630 | * | 2/1966 | Strand | 251/151 |

* cited by examiner

*Primary Examiner*—John Fox
(74) *Attorney, Agent, or Firm*—Dunlap, Codding & Rogers, P.C.

(57) ABSTRACT

A lightweight flow control valve for use in cooling towers is provided. The valve includes a lightweight, thin-walled valve body having a flow bore, an inlet port, and an outlet port. The outlet port is disposed in a substantially perpendicular relationship relative to the inlet port. The valve body has a substantially frusto-conically shaped interior surface defining the flow bore. A lightweight, thin-walled barrel having an inlet, an outlet, and a fluid passageway extending between the inlet and the outlet is disposed within the flow bore of the valve body. The inlet of the barrel is concentrically positioned relative to the inlet port of the valve body and the outlet of the barrel is disposed in a substantially perpendicular relationship relative to the inlet of the barrel. The barrel has a substantially frusto-conically shaped exterior surface sealingly engageable against the frusto-conically shaped interior surface of the valve body to provide a substantially fluid-tight seal when the barrel is in a closed position wherein the outlet of the barrel is aligned with the interior surface of the valve body. The barrel is disposed in the internal cavity of the valve body so as to be axially movable to a non-sealing position relative to the valve body to permit the barrel to be rotated to an open position wherein at least a portion of the outlet of the barrel is in open communication with the outlet port of the valve body.

4 Claims, 3 Drawing Sheets

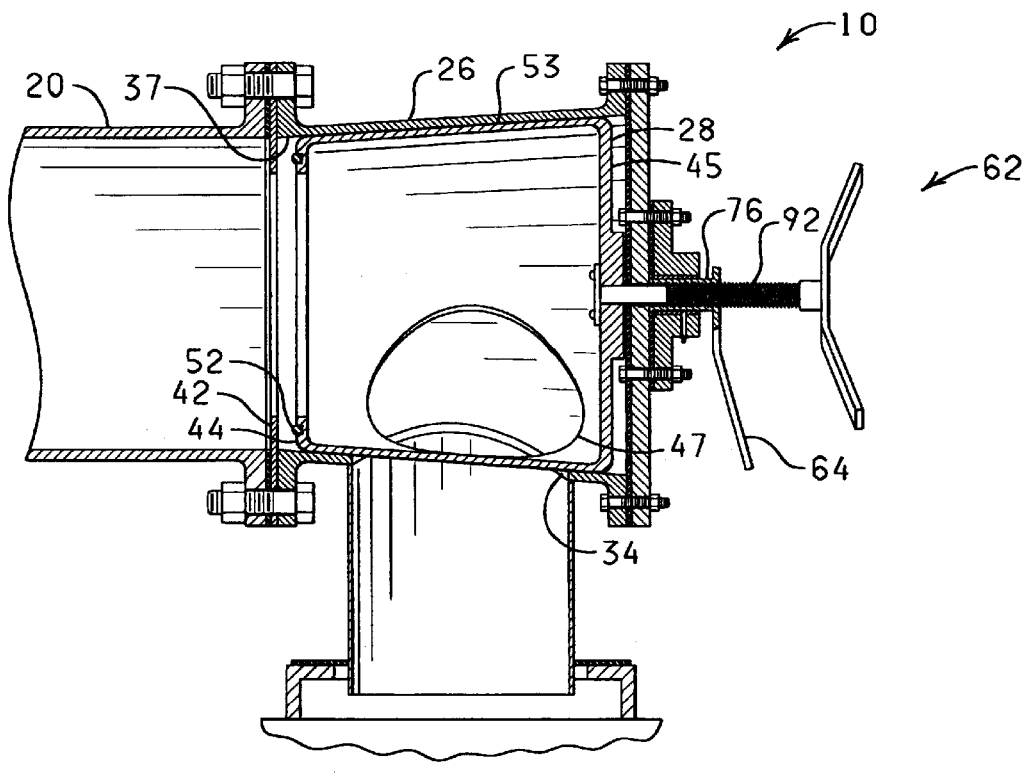
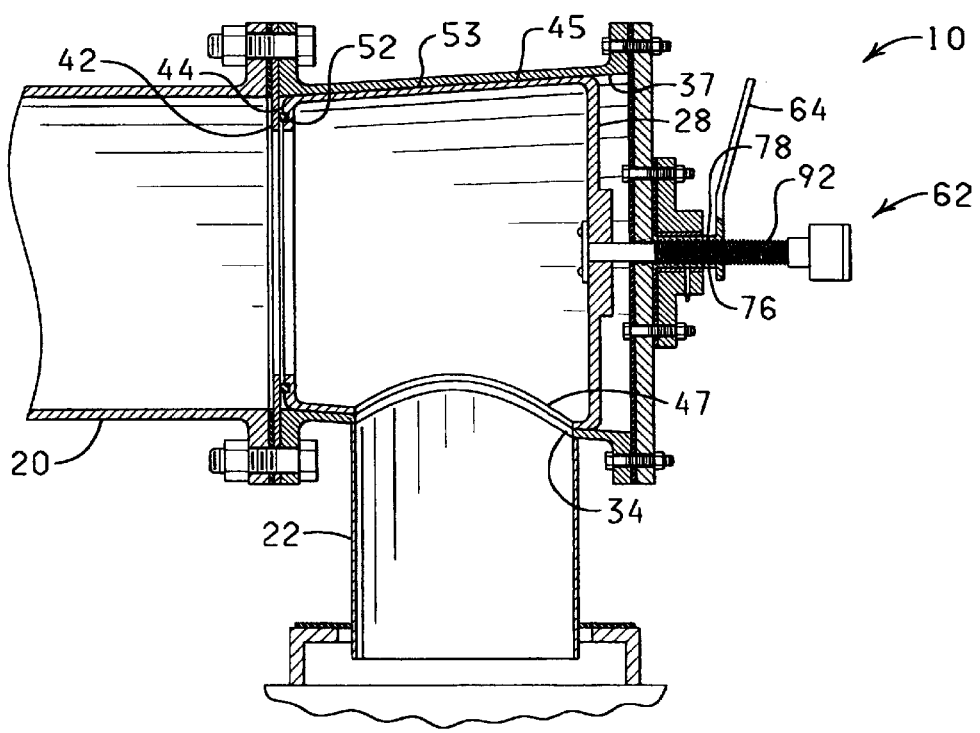

FLOW CONTROL VALVE FOR COOLING TOWER

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to valves, and more particularly, but not by way of limitation, to an improved flow control valve for cooling towers.

2. Description of Related Art

Cooling towers of varying designs are widely used in industry for the purpose of removing waste heat from a process by natural evaporation of the cooling fluid, usually water. In operation, the hot water is piped from the process to the top of the cooling tower and distributed evenly using a system of distribution headers and valves. The outlet end of each valve is also attached to a distribution box which is disposed below and adjacent the water distribution header. The flow control valves function to divert the flow of water from the distribution header into the distribution box, as well as regulate the flow of water delivered to the distribution box. The distribution box functions to reduce the kinetic energy of the water as it flows out to fill the hot water basin. The deck of this basin is provided with a plurality of metering orifices patterned to distribute water evenly over a region provided with one of a variety of materials, known as "fill". The fill region is designed to provide a cooling surface to promote evaporative cooling. In this environment, each flow control valve regulates large volumes of fluid under relatively low pressures, in contrast to valves which regulate low volumes under high pressures.

The distribution header may contain a plurality of flow control valves to divert a large volume of fluid for evaporative cooling onto a plurality of hot water basins. The efficiency of the cooling tower is based on its ability to cool a volume of hot water. It is desirable that the hot water be evenly distributed into each of the hot water basins since each cell is capable of cooling only a certain volume of water through the designed temperature range. Thus, hot water distributed unevenly to the hot water basins reduces the efficiency of the cooling tower since some hot water basins cool the water quickly while other, more full basins, continue working to cool oversupplied volumes of hot water. Therefore, cooling tower efficiency greatly depends on even distribution of hot water from the distribution header by the flow control valves onto the respective hot water basins.

The flow control valves must be capable of complete shut-off to prevent leakage of water from the distribution header, particularly in freezing conditions. In cold weather, water from a leaking valve may collect through the fill region and freeze and eventually the excess weight could cause the cooling tower to collapse. However, the primary purpose of the valves is to divert and regulate the flow of water for even distribution, as compared to applications where valve use is limited to either complete "on" or "off" control.

Also, the flow control valves must be completely supported by the distribution header. Thermal expansion generates movement of the distribution header and the attached flow control valves. This movement can cause damage to a valve fixed to both the distribution header and the distribution box. Therefore, the flow control valves are attached to and completely supported by the distribution header with each valve outlet suspended over an opening in the distribution box. To better control the fluid flow from the valves, each valve outlet may be disposed in an opening in the distribution box and sealed in place with a flexible sealant. This provides a stable and seated mount while allowing the flow control valves to move as the distribution header expands and moves without damaging the valve mountings.

The high volume of fluid passes through the valve, even at low pressure, at a high velocity head. Impingement type valve design causes turbulent flow of the large volume of water passing through the valve which forces turbulent water to unevenly wear on the supports for the valve stem and plate. Also, impingement type valve devices have a high potential for failure under high velocity head conditions since impingement type valves use rubber gaskets which harden, crack and fail to provide a fluid-tight seal thereafter.

Generally, the plates of impingement type valves are completely backed-out until the plates are supported by the body of the valve which overcomes the unnecessary wear caused by the turbulent water flow. However, the valves are then incapable of regulating the flow of the fluid from the distribution header since the valves are completely open. This shortcoming of impingement type valves significantly decreases cooling tower efficiency, given the foregoing discussion of the importance of regulating the distribution of hot water.

Although existing plug type valves are aptly suited for cooling tower applications, the weight of these plug type valves, capable of handling such large volumes of fluid, is prohibitive for such an application. Since plug type valves operate differently than impingement type valves, there is no unnecessary wear from the high volume of fluid on the regulating elements. Also, the design of plug type valves enables fluid to flow in a near laminar state. Thus, this valve configuration minimizes turbulence of the high fluid volumes which is necessary for structural stabilization of the cooling tower components and improved control of fluid distribution.

To this end, a need exists for a lightweight plug type flow control valve for use, among other applications, for cooling towers. Such lightweight plug valve should provide near laminar flow of fluid and be capable of redirecting and regulating a large volume of fluid while capable of being completely open or shut in a fluid-tight position. It is to such a valve that the present invention is directed.

SUMMARY OF THE INVENTION

The present invention is directed to a valve for flow control of hot water for cooling towers. The valve includes a lightweight, thin-walled valve body having a flow bore, an inlet port, and an outlet port. The outlet port is disposed in a substantially perpendicular relationship relative to the inlet port. The valve body has a substantially conically shaped interior surface defining the flow bore.

A lightweight, thin-walled barrel is disposed within the flow bore of the valve body. The barrel has an inlet, an outlet, and a fluid flow passageway extending between the inlet and the outlet. The inlet of the barrel is concentrically positioned relative to the inlet port of the valve body. The outlet of the barrel is disposed in a substantially perpendicular relationship relative to the inlet of the barrel. The barrel further has a substantially conically shaped exterior surface sealingly engageable against the conically shaped interior surface of the valve body to provide a substantially fluid-tight seal when the barrel is in a closed position wherein the outlet of the barrel is aligned with the interior surface of the valve body.

The barrel is disposed in the flow bore of the valve body so as to be axially movable to a non-sealing position relative to the valve body to permit the barrel to be rotated to an open position wherein at least a portion of the outlet of the barrel is in open communication with the outlet port of the valve body. An actuating assembly is connected to the barrel for axially moving the barrel relative to the valve body and for rotating the barrel between the open position and the closed position.

BRIEF DESCRIPTION OF THE SEVERAL VIEWS OF THE DRAWING

FIG. 4 is a cross-sectional view of the flow control valve of the present invention shown in an unlocked and partially opened position.

FIG. 5 is a cross-sectional view of the flow control valve of the present invention shown in a locked and full open position.

DETAILED DESCRIPTION OF THE INVENTION

Figure 1:
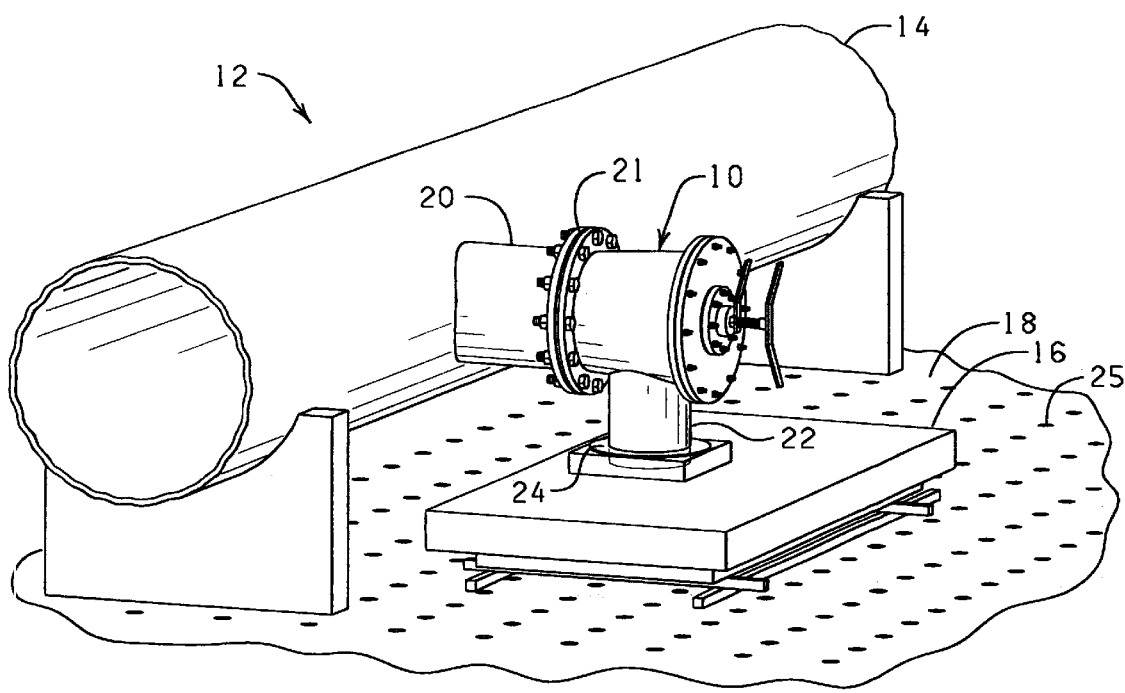
FIG. 1 is a perspective view of a flow control valve constructed in accordance with the present invention shown connected between a distribution header and a distribution box of a cooling tower.

Referring now to the drawings, and more particularly to FIG. 1, a flow control valve 10 constructed in accordance with the present invention is shown employed in a cooling tower 12. The flow control valve 10 is particularly adapted for redirecting the flow of fluids, such as hot water, produced as a by-product of an industrial process and regulating the distribution of the same for evaporative cooling purposes. The portion of the cooling tower 12 illustrated includes a distribution header 14, a distribution box 16, and a hot water basin 18.

Waste heat is carried from an industrial process in the form of hot water. The hot water is introduced into the distribution header 14; the distribution header 14 represents a portion of the hot water inlet of the cooling tower 12. The hot water is communicated to the flow control valve 10 via a header outlet 20. The header outlet 20 has a flange 21 to which the flow control valve 10 is attached. The flow control valve 10 redirects the flow of the hot water to a valve extension member 22. The valve extension member 22 projects through an opening 24 in the distribution box 16. The valve extension member 22 is fluidly sealed in the opening 24 of the distribution box 16 with a sealant, such as silicon, rubber, or other fluid-tight sealant. Thus, the flow control valve 10 is completely supported by the connection to the header outlet 20 of the distribution header 14.

This supported connection is necessary because large volumes of hot water cause the distribution header 14 to constantly expand, thus generating movement of the distribution header 14 which communicates the movement to the flow control valve 10 via the header outlet 20. Any fixed mounting of the valve extension member 22 to the distribution box 16 could result in damage to the flow control valve 10 or such mounting as a result of the movement of the distribution header 14 caused by the hot water.

The distribution box 16 serves to contain the water being delivered through the opening 24 from the valve extension member 22, such that the water is distributed onto the hot water basin 18. The hot water basin 18 is provided with a plurality of orifices 25 to stimulate evaporative cooling of the hot water distributed on the hot water basin 18.

Figure 2:
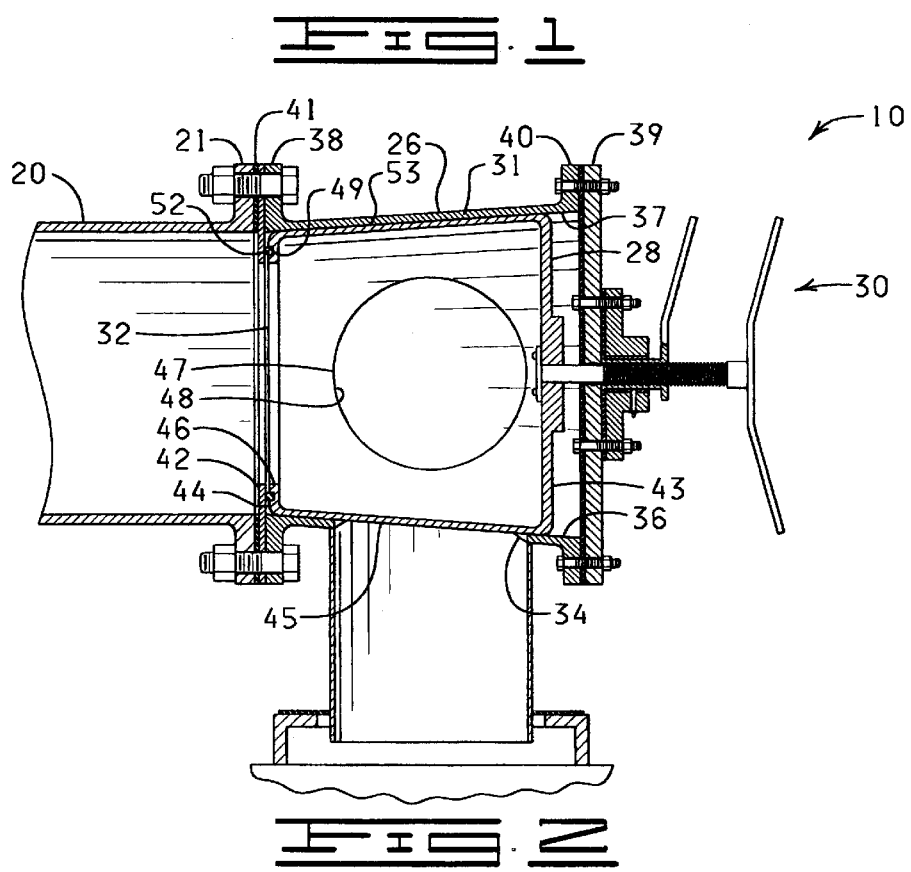
FIG. 2 is a cross-sectional view of the flow control valve of the present invention shown attached between the distribution header and the distribution box in a locked and closed position.

Referring now to FIG. 2, the flow control valve 10 of the present invention is shown in greater detail. The flow control valve 10 includes a valve body 26, a barrel 28, and an actuating assembly 30. The valve body 26 is a substantially hollow member having a thin sidewall 31, an inlet port 32, an outlet port 34, and a flow bore 36 which extends between the inlet port 32 and the outlet port 34 of the valve body 26. The outlet port 34 is disposed in a substantially perpendicular relationship to the inlet port 32. The valve body 26 is desirably constructed of a relatively lightweight material, such as fiberglass or polymeric material or a combination thereof, and has a substantially frusto-conically shaped interior surface 37 which defines the flow bore 36. The valve body 26 is provided with a flange 38 for connecting the flow control valve 10 with the header outlet 20. The flange 38 may be any conventional structure for sealing in a fluid-tight manner the flow control valve 10 to the flange 21 of the header outlet 20. The opposing end of the valve body 26 is closed with a front plate 39 which is connected to a front flange 40 of the valve body 26, the front flange 40 being any conventional structure for interconnecting the front plate 39 to the valve body 26 in a fluid-tight manner.

A gasket 41 is disposed between the flange 21 of the header outlet 20 and the flange 38 of the valve body 26 to further promote a fluid-tight seal therebetween. A barrel stop plate 42 is bonded to the flange 38 of the valve body 26 and is positioned between the valve body 26 and the flange 21 of the header outlet 20. The barrel stop plate 42 extends radially inward, forming an opening contiguous with the inlet port 32 of the valve body 26.

The barrel 28 is disposed within the flow bore 36 of the valve body 26. Like the valve body 26, the barrel 28 is desirably constructed of a relatively lightweight material, such as fiberglass or polymeric material or a combination thereof. The barrel 28 has a first end 43, a second end 44, and a sidewall 45 extending between the first end 43 and the second end 44. The barrel 28 has a generally frusto-conical shape with the sidewall 45 tapering down from the first end 43 to the second end 44. The barrel 28 further has an inlet 46, an outlet 47, and a fluid flow passageway 48 extending between the inlet 46 and the outlet 47. The inlet 46 of the barrel 28 is formed through the second end 44 of the barrel 28 and is concentrically positioned relative to the inlet port 32 of the valve body 26. The outlet 47 is formed through the sidewall 45 of the barrel 28 in a substantially perpendicular relationship relative to the inlet 46 so as to be alignable with the outlet port 34 of the valve body 26. The second end 44 of the barrel 28 is provided with an annular groove 49 in which a seal member 52, such as an o-ring, constructed of a rubber, polymeric or other fluid sealing material, is positioned. Thus, when the second end 44 of the barrel 28 engages the barrel stop plate 42, the seal member 52 forms a fluid-tight seal therebetween.

An exterior surface 53 of the conically shaped sidewall 45 of the barrel 28 is shaped to substantially conform to the contour of the interior surface 37 of the valve body 26 when the barrel 28 is in the locked position. Therefore, engagement of the exterior surface 53 of the sidewall 45 of the barrel 28 against the frusto-conically shaped interior surface 37 of the valve body 26 provides a substantially fluid-tight seal when the barrel 28 is in a closed position wherein the outlet 47 is aligned with the interior surface 37 of the valve body 26, as shown in FIG. 2. The barrel 28 is disposed in the flow bore 36 of the valve body 26 so as to be axially movable to a non-sealing position relative to the valve body 26 to permit the barrel 28 to be rotated between an open or closed position. The open position is defined when the outlet 47 of the barrel 28 is axially aligned relative to the outlet port 34 of the valve body 26. The actuating assembly 30 is connected to the barrel 28 to provide for the axial rotation of the barrel 28 relative to the valve body 26.

Figure 3:
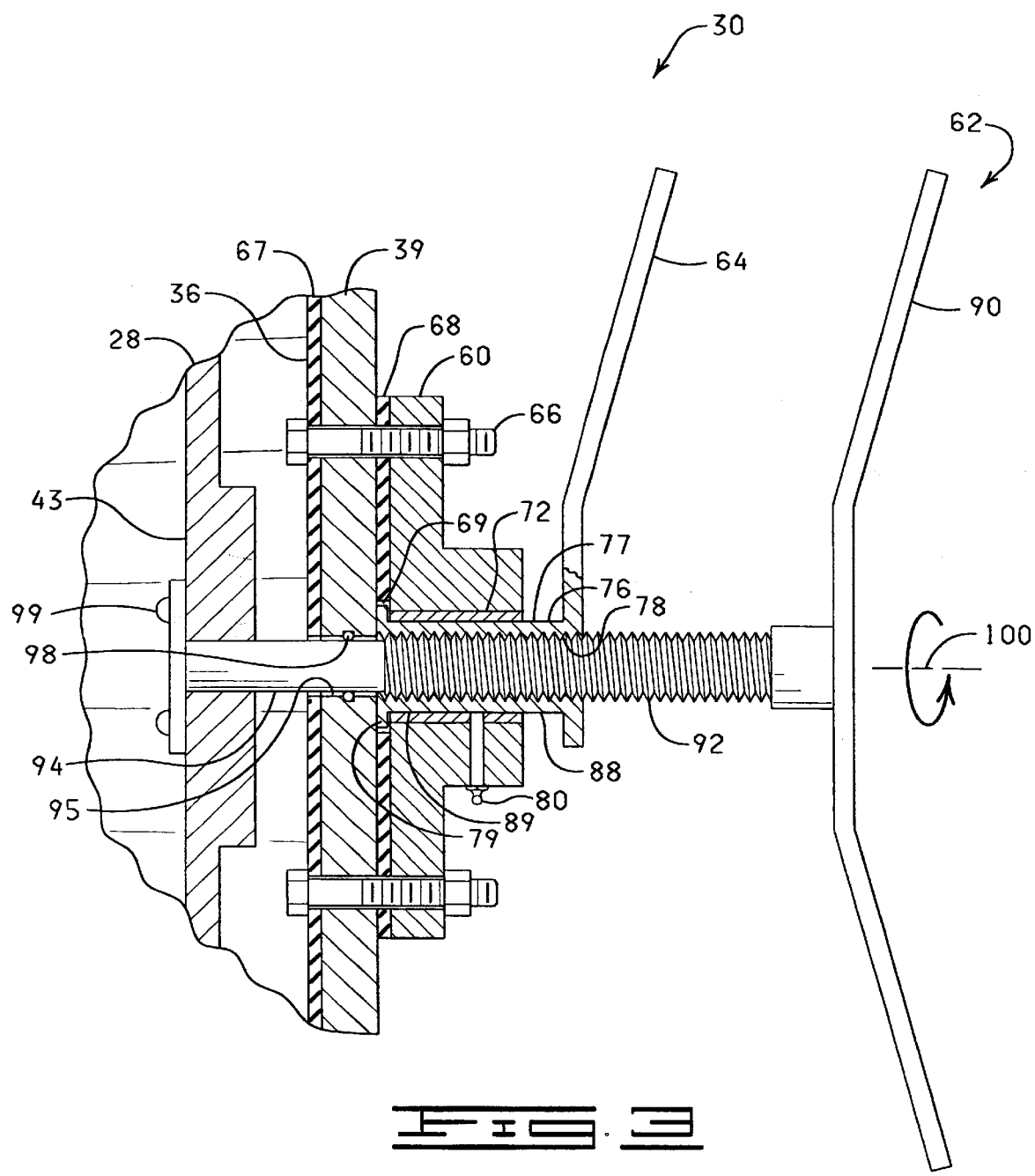
FIG. 3 is an enlarged cross-sectional view of the actuating assembly of the flow control valve of the present invention.

Referring now to FIG. 3, the actuating assembly 30 of the flow control valve 10 is shown in an enlarged cross-sectional view. The actuating assembly 30 includes a thrust bushing 60, an operating arm 62, and a locking arm 64. The thrust bushing 60 is connected to the front plate 39 of the valve body 26 by fasteners 66, such as a nut and bolt combination. A gasket 67, connected to the front plate 39 by a plurality of fasteners 66 and disposed within the flow bore 36, has the effect of providing a fluid-tight seal for the interconnection of the front plate 39 to the valve body 26 as well as fluid-tight engagement of the fasteners 66. A spacer 68 having a central opening 69 is disposed between the thrust bushing 60 and the front plate 39.

The locking arm 64 is connected to a lock nut 76 which includes an outer surface 77 and an inner threaded surface 78. A bushing liner 72 is connected to the thrust bushing 60 and is disposed between the thrust bushing 60 and the outer surface 77 of the lock nut 76. The bushing liner 72 supports the outer surface 77 of the lock nut 76 which projects through the bushing liner 72. The lock nut 76 has a first end 88 and a second end 89. The locking arm 64 is attached to the lock nut 76 near the first end 88. The second end 89 of the lock nut 76 has a flange 79. The flange 79 projects into the central opening 69 of the spacer 68 between the thrust bushing 60 and the front plate 39 so as to anchor the lock nut 76 disposed within the bushing liner 72 and the thrust bushing 60. The thickness of the flange 79 is less than the thickness of the spacer 68. The variance of the thickness of the flange 79 relative to that of the spacer 68 allows for limited axial movement of the flange 79, and therefore the lock nut 76 attached thereto, within the central opening 69 of the spacer 68.

An opening 80 is provided through the thrust bushing 60 and the bushing liner 72 for introducing lubricant, such as grease or other lubricating material for lubricating the support of the bushing liner 72 and the outer surface 77 of the lock nut 76. The locking arm 64, which is connected to the lock nut 76, is manually operable in a rotating manner with the introduction of the lubricating material within the bushing liner 72.

The operating arm 62 includes a handle portion 90, a threaded portion 92 and a lower non-threaded portion 94. The threaded portion 92 extends through and threadingly engages the inner threaded surface 78 of the lock nut 76. The non-threaded lower portion 94 of the operating arm 62 slidingly projects through an opening 95 of the front plate 39 and is connected to the first end 43 of the barrel 28, substantially as shown in FIG. 3. The front plate 39 is provided with an seal member 98, such as an o-ring, in the interior surface thereof to provide a substantially fluid-tight seal between the front plate 39 and the non-threaded lower portion 94 of the operating arm 62.

The handle portion 90 of the operating arm 62 is graspable by the hand of an individual and rotatably movable about an axis of rotation 100. When a rotating action is applied to the handle portion 90 of the operating arm 62, the threaded portion 92 threadingly rotates within the inner threaded surface 78 of the lock nut 76, which further has the effect of rotating the non-threaded lower portion 94 which is secured to the barrel 28 with fastener 99, such as a nut and bolt combination, and thereby effects the rotation of the barrel 28 about the axis of rotation 100.

Thus, maintaining the operating arm 62 in a static position while rotating the locking arm 64 about the axis of rotation 100, the threaded engagement of the inner threaded surface 78 of the lock nut 76 with the threaded portion 92 of the operating arm 62 causes axial movement of the lock nut 76 within the bushing liner 72. This axial movement effected by rotation of the lock nut 76 relative to the threaded portion 92 of the operating arm 62 is communicated to the barrel 28 via the lower non-threaded portion 94 of the operating arm 62 attached thereto. Further, the threaded engagement of the threaded portion 92 of the operating arm 62 against the inner threaded surface 78 of the lock nut 76 allows for rotation of the barrel 28 by rotation of the operating arm 62 without effecting movement upon the locking arm 64.

Referring now to FIG. 4, a cross-sectional view of the flow control valve 10 is shown in an unlocked position with the barrel 28 being rotated to a partially open position. The locking arm 64 is disposed in a downward unlocked position whereby the rotation of the locking arm 64 in a clockwise direction causes axial movement of the lock nut 76. Because the threaded portion 92 of the operating arm 62 is threadingly engaged with the inner threaded surface 78 of the lock nut 76, the axial movement of the locking arm 64 is communicated to the threaded portion 92 of the operating arm 62.

The connection of the operating arm 62 to the barrel 28 causes axial movement of the barrel 28. This axial movement effected by the locking arm 64 causes the barrel 28 to move away from its fluid-tight engagement with the barrel stop plate 42 of the valve body 26. Therefore, fluid from the header outlet 20 is allowed to pass between the seal member 52 of the valve body 26 and the second end 44 of the barrel 28. This fluid acts as a lubricant between the interior surface 37 of the valve body 26 and the sidewall 45 of the barrel 28 to facilitate rotation of the barrel 28 within the valve body 26 which could be difficult due to the large volumes of fluid passing from the header outlet 20 into the fluid passageway 48 of the barrel 28.

With the barrel 28 sealingly disengaged from the valve body 26, the operating arm 62 is used to rotate the barrel 28 to the desired operating position. The barrel 28 may be rotated from the closed position, as shown in FIG. 2, wherein the outlet 47 of the barrel 28 is aligned with a portion of the interior surface 37 of the valve body 26 forming a fluid-tight seal therebetween, to a partially open position, as shown in FIG. 4, wherein a portion of the outlet 47 of the barrel 28 is aligned with the outlet port 34 of the valve body 26. Once the barrel 28 has been rotated to the desired position, the locking arm 64 is rotated in a counterclockwise direction to cause the barrel 28 to move axially into sealing engagement with the barrel stop plate 42 of the valve body 26.

The partially open disposition of the flow control valve 10, as shown in FIG. 4, allows for effective incremental regulation of the flow of fluid from the header outlet 20 to the valve extension member 22. This is necessary in that the portion of the cooling tower 12, specifically the hot water basin 18, is capable of cooling hot water flowing from the distribution header 14 at a predetermined rate. Hot water supplied to the hot water basin 18 via the flow control valve 10 in excess of the predetermined rate does not cool efficiently.

Referring now to FIG. 5, a cross section of the flow control valve 10 is shown in the full open and locked position. The barrel 28 is shown to be rotated such that the outlet 47 of the barrel 28 is aligned so as to be in open communication with the outlet port 34 of the valve body 26. Further, the locking arm 64 is shown to be in the locked position whereby the lock nut 76 threadingly engages the threaded portion 92 of the operating arm 62, which effects an axial movement on the barrel 28 such that the second end 44 of the barrel 28 is brought into sealing engagement with the barrel stop plate 42 via the seal member 52 and the exterior surface 53 of the sidewall 45 of the barrel 28 is in sealing contact with the interior surface 37 of the valve body 26. In such a full, open position, the flow control valve 10 allows for the passage of a maximum amount of fluid from the header outlet 20 to the valve extension member 22 via the fluid flow passageway 48 (not shown in FIG. 5) of the barrel 28.

One of the advantages of the frusto-conical shape of the barrel 28 and the valve body 26 is that the fluid flowing through the flow control valve 10 is maintained in a substantially laminar flow condition. Thus, the substantially frusto-conically shaped barrel 28 and the substantially perpendicular disposition of the inlet port 32 and outlet port 34 of the valve body 26 allow fluid flow with only minimal turbulent disruption due to the design of the flow control valve 10. Even when the flow control valve 10 is in a partially open position, such as shown in FIG. 4, the high volume and low pressure of the hot water from the header outlet 20 produces the same near laminar flow of fluid. Another advantage of the flow control valve 10 of the present invention is that it lends itself to being constructed of lightweight materials. This is significant in that valve size and weight are of concern for cooling tower use for reasons previously discussed.

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

What is claimed is:

1. A valve comprising:

a valve body having a flow bore, an inlet port, and an outlet port, the outlet port disposed in a substantially perpendicular relationship relative to the inlet port, the valve body having a substantially frusto-conically shaped interior surface defining the flow bore and a barrel stop plate extending radially inward and contiguous with the inlet port of the valve body;

a barrel disposed within the flow bore of the valve body, the barrel having an inlet, an outlet, and a fluid flow passageway extending between the inlet and the outlet, the inlet of the barrel concentrically positioned relative to the inlet port of the valve body and the outlet of the barrel disposed in a substantially perpendicular relationship relative to the inlet of the barrel, the barrel having a substantially frusto-conically shaped exterior surface and the barrel movable between a locked position wherein the frusto-conically shaped exterior surface of the barrel is sealingly engaged against the frusto-conically shaped interior surface of the valve body and an unlocked position wherein the barrel is in a non-sealing engaging relationship relative to the valve body, the barrel having a seal member which sealingly engages the barrel stop plate when the barrel is in the locked position, the barrel further movable in the unlocked position between a closed position wherein the outlet of the barrel is aligned with the interior surface of the valve body and an open position wherein at least a portion of the outlet of the barrel is open communication with the outlet port of the valve body; and actuating means connected to the barrel for axially moving the barrel relative to the valve body between the locked position and the unlocked position and for rotating the barrel between the open position and the closed position when the barrel is in the unlocked position.

2. The valve of claim 1, wherein the valve body is constructed of a material selected from the group consisting of fiberglass, polymeric material, or a combination thereof.

3. The valve of claim 2, wherein the barrel is constructed of a material selected from the group consisting of fiberglass, polymeric material, or a combination thereof.

4. The valve of claim 1, wherein the barrel is constructed of a material selected from the group consisting of fiberglass, polymeric material, or a combination thereof.

* * * * *